United States Patent
Demerath (10) Patent No.: US 11,993,135 B2
(45) Date of Patent: May 28, 2024

(54) AIR VENT FOR A VEHICLE

(71) Applicant: ILLINOIS TOOL WORKS INC., Glenview, IL (US)

(72) Inventor: Michael Demerath, Hüffler (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 478 days.

(21) Appl. No.: 17/293,371

(22) PCT Filed: Nov. 13, 2019

(86) PCT No.: PCT/US2019/061091
§ 371 (c)(1),
(2) Date: May 12, 2021

(87) PCT Pub. No.: WO2020/106515
PCT Pub. Date: May 28, 2020

(65) Prior Publication Data
US 2022/0009314 A1 Jan. 13, 2022

(30) Foreign Application Priority Data
Nov. 23, 2018 (DE) ...................... 10 2018 129 603.7

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .................. F24F 13/15; B60H 1/3421; B60H 2001/3471
(Continued)

(56) References Cited

U.S. PATENT DOCUMENTS 9,989,275 B2 * 6/2018 Oe ..................... B60H 1/3421
2013/0178141 A1 7/2013 Hoke

FOREIGN PATENT DOCUMENTS

DE 202005012570 U1 10/2005
DE 102007036532 B4 2/2009
(Continued)

OTHER PUBLICATIONS

PCT, International Search Report and Written Opinion, International Application No. PCT/US2019/061091; dated Mar. 3, 2020, 12 pages.
(Continued)

*Primary Examiner* — Allen R. B. Schult
(74) *Attorney, Agent, or Firm* — THOMPSON HINE LLP (57) ABSTRACT

An air vent (1) for a vehicle, including a housing (2) whose housing wall delimits an air duct (3), at least one air-guiding slat (5) in the air duct (3) which is pivotable or rotatable relative to the housing wall about an axis of rotation (6), or a slat pack (4) in the air duct (3) having a multiplicity of air-guiding slats (5), each of them being pivotable or rotatable relative to the housing wall about one axis of rotation (6), such that the air duct (3) is subdivided into a multiplicity of sub-ducts (7), and at least one lateral blocking element (8) which is displaceable, pivotable or rotatable relative to the at least one air-guiding slat (5) or the air-guiding slats (5) of the slat pack (4) and to the housing wall for the purpose of blocking a sub-duct (7) formed between the at least one air-guiding slat (5) or an outer air-guiding slat (5) of the slat pack (4) and the housing wall.

17 Claims, 6 Drawing Sheets

(58) Field of Classification Search
USPC .......................................................... 454/155
See application file for complete search history.

(56) References Cited

FOREIGN PATENT DOCUMENTS

| | | | |
|---|---|---|---|
| DE | 202010009031 U1 | 10/2010 | |
| DE | 102011120877 A1 | 6/2013 | |
| DE | 202013100019 U1 | 6/2013 | |
| DE | 202015102026 U1 | 6/2015 | |
| DE | 102014001959 A1 * | 8/2015 | ........... B60H 1/3421 |
| DE | 202013012285 U1 | 1/2016 | |
| DE | 102017111011 A1 | 7/2017 | |
| DE | 102016214186 A1 | 2/2018 | |
| EP | 2777966 A1 | 9/2014 | |
| EP | 2881272 A1 | 6/2015 | |
| FR | 2747617 A1 | 10/1997 | |

OTHER PUBLICATIONS

3rd PCT Third Party Observation; PCT/US2019/061091: Jan. 15, 2021, 2 pages.

\* cited by examiner

AIR VENT FOR A VEHICLE

TECHNICAL FIELD

The present invention concerns an air vent, in particular for a ventilation system of a vehicle. The invention furthermore concerns a ventilation system with such an air vent.

BACKGROUND

In general, ventilation systems for vehicles use air vents or air outlet nozzles which allow targeted control of the emerging air jet. Such air vents serve in particular to supply fresh air to a vehicle interior.

The air flows via an inlet opening of the air vent into the air duct delimited by the housing wall of the air vent, through said duct, and finally emerges from the outlet opening of the air vent into the interior of a vehicle (for example a car or truck). In principle, the air stream follows a main flow direction which may in particular run parallel to a longitudinal axis of the housing.

In known air vents, the air flow is deflected from the main flow direction by one or more air-guiding elements, for example pivotable air-guiding slats. Also, in addition to the air-guiding elements, the housing of the air vent delimiting the air duct may serve to deflect the air from the main flow direction.

Thus for example, air vents are known in which the housing walls run towards each other in arcuate form, wherein an air stream directed by the air-guiding element onto the arcuate housing wall follows the arcuate form and thus undergoes a corresponding deflection.

Such air vents are known for example from DE 20 2015 102 026 U1, DE 20 2013 012 285 U1, or DE 10 2017 111 011 A1.

Because of the arcuate form of the housing wall, such air vents are however relatively difficult to produce, in particular using a plastic injection-molding process.

Secondly, air vents are known in which the housing walls are formed substantially parallel to the main flow direction of an air stream flowing through the air vent. In this context, reference is made for example to DE 10 2016 214 186 A1 or DE 10 2007 036 532 B4.

In these air vents, generally known from the prior art, which have a housing in which the housing wall at least regionally delimits an air duct for air flowing through the air vent in the main flow direction, wherein the housing wall runs substantially parallel to the main flow direction of the air flowing through the air vent, any necessary deflection of the air flowing through the air vent in the main flow direction by means of air-guiding elements (air-guiding slats), which are pivotable or rotatable correspondingly relative to the housing wall, is not optimal with regard to flow speed and flow resistance.

In air vents with a housing in which the housing wall runs at least substantially parallel to the main flow direction of the air flowing through the air vent, usually the air flow is deflected from the main flow direction by means of air-guiding slats provided in the air vent, which are pivoted accordingly relative to the housing wall of the air vent. In this way, the air flow is deflected laterally by the inner air-guiding slats and conducted to the housing wall, and deflected again thereby in the direction of the housing wall. As a result, some of the orientation effect of the air-guiding slats of the slat pack is lost.

Apart from this, when the air flow in the air vent is deflected by means of air-guiding slats, as known in the prior art, the flow speed of the air flowing through the air vent is often reduced disproportionately, since the arrangement of the inner air-guiding slats in a position outside the straight-ahead position causes a disproportionately great pressure loss. In particular, because of the design, the air vents known from the prior art have disadvantages in air deflection. Thus in many air vents, for example outside a straight-ahead position of the air-guiding elements and in particular when these are in an extreme position, the air is deflected multiple times, which leads to increased flow resistance. This has a particularly pronounced adverse effect on the function of the air-guiding element since the emerging air stream expands before the outlet opening of the air vent, which is also undesirable. In addition, the air deflection used in the prior art causes an increased flow resistance.

SUMMARY

On the basis of the above-described problem, the present invention is based on the object of refining an air vent of the type cited initially such that an optimized air deflection is guaranteed, wherein in particular the air deflection does not lead to undesirable expansion of the air stream at the outlet opening of the air vent, wherein furthermore only a low flow resistance is present.

This object is achieved according to the invention by the subject of the independent claim 1, wherein advantageous refinements of the air vent according to the invention are given in the dependent claims.

Accordingly, the present invention concerns in particular an air vent for a vehicle, wherein the air vent has a housing in which the housing wall at least regionally delimits an air duct for air flowing through the air vent in a main flow direction. In the air duct, at least one air-guiding slat is provided which is pivotable or rotatable relative to the housing wall about an axis of rotation, or a slat pack having a multiplicity of air-guiding slats which are pivotable or rotatable relative to the housing wall about a respective axis of rotation. In detail, the at least one air-guiding slat or the air-guiding slats of the slat pack are arranged in the air duct such that, at least in the region of the at least one air-guiding slat or in the region of the slat pack, said duct is divided or split into a multiplicity of sub-ducts.

According to the invention, in particular in addition to the at least one air-guiding slat or air-guiding slats, at least one lateral blocking element is provided which is displaceable, pivotable or rotatable relative to the at least one air-guiding slat or air-guiding slats and relative to the housing wall, for the purpose of blocking, as required, a sub-duct formed between the at least one air-guiding slat or an outer air-guiding slat of the slat pack and the housing wall in the region of the slat pack.

In particular, according to the invention it is provided that the at least one air-guiding slat or the air-guiding slats of the slat pack is/are adjustable between a straight-ahead position, in which the at least one air-guiding slat or the air-guiding slats of the slat pack is/are each oriented parallel to the main flow direction, and at least one extreme position, wherein in the at least one extreme position, the at least one air-guiding slat or the air-guiding slats of the slat pack is/are deflected to a maximum extent relative to the main flow direction. Advantageously, there are at least two extreme positions, namely a first extreme position in which the at least one air-guiding slat or air-guiding slats of the slat pack is/are deflected to a maximum extent, for example clockwise relative to the main flow direction, and a second extreme position in which the at least one air-guiding slat or air-guiding slats of the slot pack is/are deflected to a maximum extent counterclockwise relative to the main flow direction.

The at least one lateral blocking element is preferably designed to block, i.e. close, the sub-duct between the at least one air-guiding slat or an outer air-guiding slat of the slat pack and the housing wall, preferably only in one of the at least one extreme position of the at least one air-guiding slat or the air-guiding slats of the slat pack.

By this measure, the effective flow cross-section in the region of the at least one air-guiding slat or slat pack is reduced; however, by selective blocking of a sub-duct formed at the outer edge of the at least one air-guiding slat or slat pack, the through-flow of air through the air duct of the air vent is substantially optimized. In particular, it may be achieved that the proportion of air deflected from the main flow direction by the at least one air-guiding slat and directly impacting on the housing wall, where it leads to turbulence and partial loss of the oriented effect of the slat pack, is reduced.

With regard to the at least one blocking element, it is conceivable that—with the exception of a situation in which the at least one air-guiding slat or air-guiding slats of the slat pack is/are in an extreme position—this blocking element serves as an air-guiding element. For example, it is conceivable that the at least one lateral blocking element is adjustable between a straight-ahead position, in which the lateral blocking element is oriented parallel to the main flow direction, and a blocking position, in which the lateral blocking element is pivoted into the sub-duct between the at least one air-guiding slat or the outer air-guiding slat of the slat pack and the housing wall.

The at least one lateral blocking element is in this blocking position in particular when the at least one air-guiding slat or the air-guiding slats of the slat pack is/are in an extreme position. On the transition into the blocking position, the at least one blocking element is rotated or pivoted relative to the housing wall in a direction which is opposite the direction in which the at least one air-guiding slat or air-guiding slats of the slat pack is/are rotated or pivoted on the transition into the extreme position.

Advantageous refinements of the air vent according to the invention in relation to embodiments of the air vent are described below, wherein a slat pack, with a multiplicity of air-guiding slats which are rotatable or pivotable relative to the housing wall about a respective rotation axis, is provided in the air duct of the air vent. The statements below also apply in transferred fashion to embodiments in which only a single air-guiding slat, which is pivotable or rotatable relative to the housing wall about a rotation axis, is provided in the air duct of the air vent.

According to advantageous embodiments of the air vent according to the invention, the at least one lateral blocking element is designed to assume its blocking position only if the outer air-guiding slat of the slat pack facing the at least one lateral blocking element assumes its extreme position in which it is pivoted in the direction of the lateral blocking element.

According to embodiments of the invention, the at least one lateral blocking element is in particular designed to run parallel to the air-guiding slats when the air-guiding slats of the slat pack are in the straight-ahead position, and when the air-guiding slats are pivoted out of the straight-ahead position away from the lateral blocking element, to follow the pivoting movement of the air-guiding slats and to serve as an air-guiding element.

For synchronizing and actuating the at least one blocking element, various embodiments are considered. For example, it is conceivable that the at least one blocking element has an in particular electric motor drive, which adjusts the correspondingly assigned blocking element accordingly depending on the position of the air-guiding slats of the slat pack.

Instead of such an electric motor actuation of the at least one blocking element, it is however also conceivable to provide a mechanical coupling between the at least one blocking element and at least one of the air-guiding slats of the slat pack.

Thus for example it is conceivable that the at least one blocking element is operatively coupled for example to the outer air-guiding slat of the slat pack via a slotted guide. In this context, the term "outer air-guiding slat" means the outer air-guiding slat of the slat pack which is arranged directly adjacent to the at least one blocking element.

The slotted guide has a preferably slot-shaped, web-shaped or groove-shaped control curve in which a preferably peg-shaped sliding block of the blocking element engages. When the air-guiding slats of the slat pack are pivoted or rotated relative to the housing wall, the sliding block of the blocking element, and hence the blocking element, is correspondingly positively guided. The control curve is connected in particular fixedly to the slat pack, and in particular to the (outer) air-guiding slat of the slat pack facing the blocking element.

In this context, it is for example conceivable that the control curve has a substantially L-shaped course with a first limb region and a second limb region, wherein the first and second limb regions of the control curve course are preferably of slightly curved form. According to conceivable embodiments of the air vent according to the invention, the second limb region of the control curve course is preferably formed to be longer than the first limb region of the control curve course.

Here it would be suitable for the control curve to be designed such that, in a straight-ahead position (with respect to the main flow direction) of the air-guiding slats of the slat pack, the sliding block of the blocking element is positioned in a region between the first and second limb regions of the control curve. Furthermore, then the blocking element is oriented parallel to the air-guiding slats of the slat pack and hence parallel to the main flow direction.

However, according to embodiments of the solution according to the invention, the sliding block of the blocking element is positioned in the first limb region of the control curve when the air-guiding slat of the slat pack facing the blocking element is pivoted or rotated out of the straight-ahead position, relative to the housing wall, in the direction of the blocking element. In this state, i.e. when the sliding block of the blocking element is positioned in the first limb region of the control curve, the blocking element is preferably in its blocking position.

Secondly, the sliding block of the blocking element is positioned in the second limb region of the control curve when the air-guiding slat of the slat pack facing the blocking element is pivoted or rotated out of its straight-ahead position, relative to the housing wall, away from the blocking element. In this state, the blocking element either runs parallel to the housing wall or to the main flow direction (if the blocking element has no air-guiding function) or parallel to the air-guiding slats of the slat pack (if the blocking element performs a corresponding air-guiding function).

The sliding block of the blocking element, viewed in the main flow direction, is preferably arranged on the blocking element downstream of a rotation axis of the blocking element. The blocking element is pivotable or rotatable about this rotation axis relative to the housing wall and relative to the air-guiding slats of the slat pack.

In refinements of the solution according to the invention, it is provided that at least two control curves are used. For example, it is conceivable that the slotted guide has a further preferably slot-shaped, web-shaped or groove-shaped control curve, in which a further preferably peg-shaped sliding block of the blocking element engages, and when the air-guiding slats of the slat pack are pivoted or rotated relative to the housing wall, is correspondingly positively guided at least in regions. The further sliding block of the blocking element, viewed in the main flow direction, is arranged on the blocking element upstream of the rotation axis of the blocking element. The further control curve is however again fixedly connected to the slat pack and in particular to the (outer) air-guiding slat of the slat pack facing the blocking element.

In this embodiment, in which the slotted guide has at least one further control curve, it is suitable for the further control curve to have a course which at least substantially corresponds to the course of the control curve in the second limb region. In this way, it can be achieved that the blocking element is moved in synchrony with the air-guiding slats of the slat pack when the air-guiding slats of the slat pack are pivoted or rotated into their extreme position away from the blocking element.

In the latter embodiment, in particular it is provided that the further sliding block of the blocking element is positioned in the further control curve preferably only if the air-guiding slat of the slat pack facing the blocking element is pivoted or rotated out of its straight-ahead position, relative to the housing wall, away from the blocking element.

BRIEF DESCRIPTION OF THE DRAWINGS

Exemplary embodiments of the air vent according to the invention are described in more detail below with reference to the attached drawings.

The drawings show.

DETAILED DESCRIPTION

The invention, as described in detail below with reference to the attached drawings, concerns in particular an optimized slat kinematic for ventilation nozzles or air vents 1. In principle, ventilation nozzles or air vents 1 are known which usually have a straight housing 2 and a slat pack 4 arranged in the interior of the housing 2.

Alternatively, air vents 1 are also known in which the housing 2 widens in a region between the inner slat pack 4 and the outlet opening.

Because the housing 2 is internally smaller (narrower) than the outlet opening, furthermore a greater flow resistance is produced in all angular positions of slats.

In air vents 1 with a straight housing 2, part of the air stream laterally deflected by the inner slats is conducted onto the housing wall and deflected further thereby, in particular in the direction of the housing wall. As a result, part of the orientation effect of the slat pack 4 is lost.

In air vents 1 which have a widened housing 2 in the flow direction, the disadvantage arises that the widening of the housing 2 also causes an expansion of the air stream inside the air vent 1. Usually however, a bundled, concentrated air stream in the passenger compartment is desirable, because this can be oriented more precisely in a targeted fashion and because the flow speed in the region of the vehicle occupants is greater in the case of a bundled air stream.

The solution according to the invention, as described in more detail below with reference to the attached drawings, is distinguished in that in the interior of the housing 2 of the air vent 1, in addition to the air-guiding slats 5 of the slat pack 4, at least one lateral blocking element 8 is provided. This blocking element 8 is synchronized with the air-guiding slats 5 of the slat pack 4 such that—with the exception of a situation in which the air-guiding slats 5 of the slat pack 4 are in their extreme position pivoted in the direction of the lateral blocking element 8—the lateral blocking element 8 in principle stands parallel to the air-guiding slats 5 of the slat pack 4 in order to keep the flow resistance as low as possible.

Accordingly, the air vents 1 according to the invention are distinguished in that they achieve a maximum deflection angle of the emerging air but have minimum flow resistance, and expand the air stream as little as possible even in the case of long outlet vents.

Figure 1:
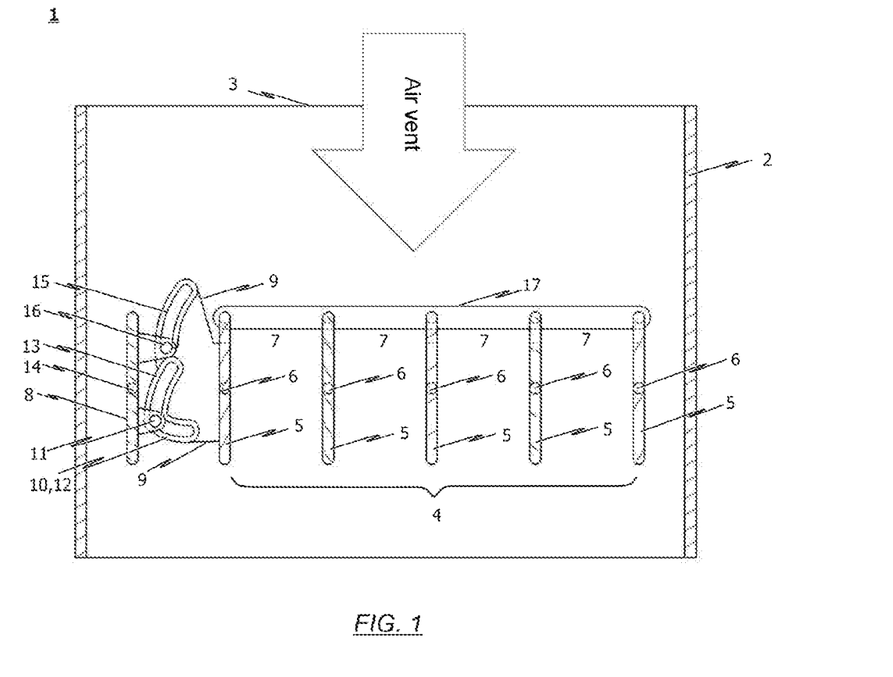
FIG. 1 a first exemplary embodiment of the air vent according to the invention in a state in which the air-guiding slats of the slat pack are in the straight-ahead position.
Figure 2:
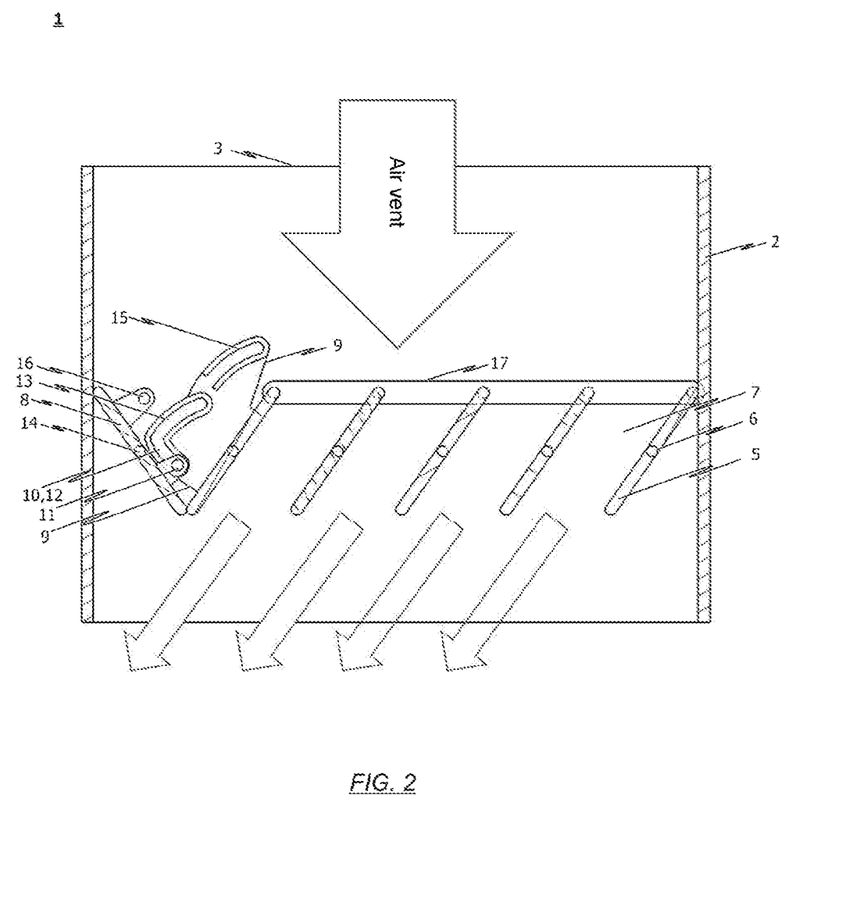
FIG. 2 diagrammatically and in a cross-sectional view, the region of the air vent from FIG. 1 but in a state in which the air-guiding slats of the slat pack are in a first extreme position, in which the air-guiding slats of the slat pack are pivoted in the direction of the lateral blocking element.
Figure 3:
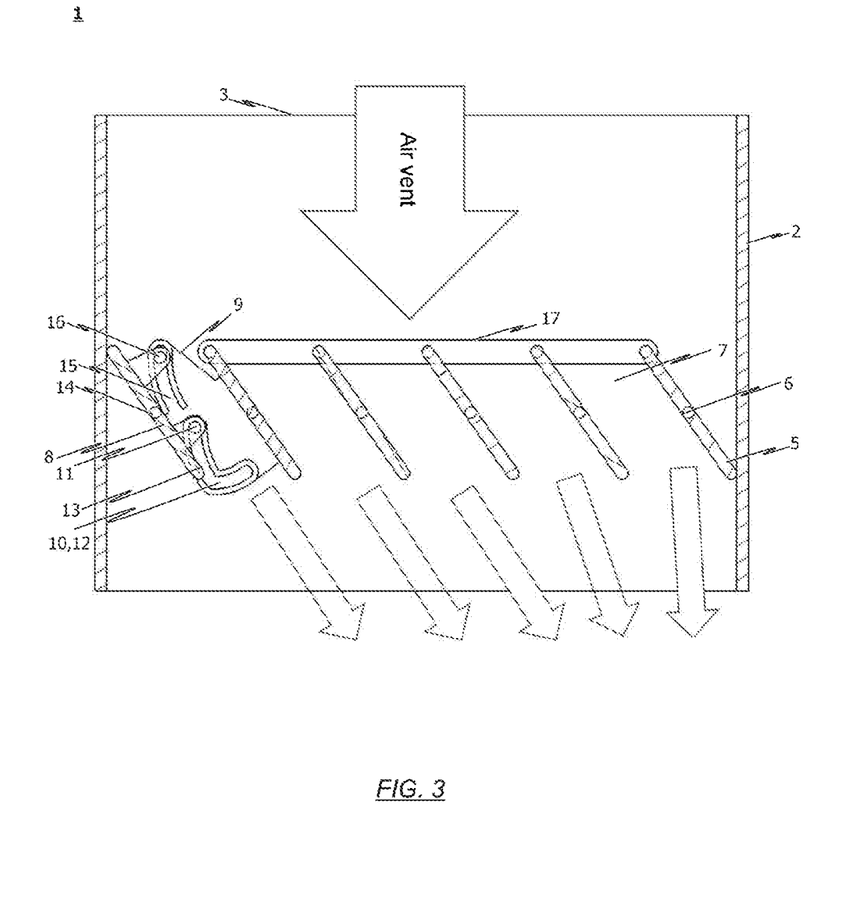
FIG. 3 diagrammatically and in a cross-sectional view, the extract of the air vent from FIG. 1 in a state in which the air-guiding slats of the slat pack are in the second extreme position.

A first exemplary embodiment of the air vent 1 according to the invention is shown partially and diagrammatically in a sectional view in FIGS. 1 to 3.

In detail, the air vent 1 has a housing 2, the housing wall of which at least in regions delimits an air duct 3 for air flowing through the air vent 1 in a main flow direction. In the air duct 3, a slat pack 4 is provided which has a multiplicity of air-guiding slats 5 which can be pivoted or rotated relative to the housing wall about a respective rotation axis 6, such that in the region of the slat pack 4, the air duct 3 is divided into a multiplicity of sub-ducts 7.

In the first exemplary embodiment of the air vent 1 according to the invention, the air-guiding slats 5 of the slat pack 4 can each be pivoted or rotated relative to the housing wall about a respective rotation axis 6 which is arranged approximately centrally with respect to the corresponding air-guiding slat 5. The respective upstream end regions of the individual air-guiding slats 5 are connected together via a corresponding synchronization element 17 in the form of a synchronization rod, such that the individual air-guiding slats 5 of the slat pack 4 are always oriented parallel to each other.

FIG. 1 shows a first exemplary embodiment of the air vent 1 according to the invention in a state in which the air-guiding slats 5 of the slat pack 4 are in the straight-ahead position. In the straight-ahead position, the air-guiding slats 5 of the slat pack 4 are each oriented parallel to the main flow direction.

FIG. 2 however shows a state of the air vent 1 in which the air-guiding slats 5 of the slat pack 4 are in their first extreme position, in which namely the air-guiding slats 5 of the slat pack 4 are pivoted to a maximum extent in a first direction. In FIG. 3, the air vent 1 is shown in the second extreme position of the air-guiding slats 5 of the slat pack 4, in which the air-guiding slats 5 are pivoted or rotated to a maximum extent relative to the housing 2 of the air vent 1 in the opposite direction with respect to the state in FIG. 2.

The exemplary embodiment of the air vent 1 according to the invention is in particular distinguished in that, in addition to the air-guiding slats 5 of the slat pack 4, at least one lateral blocking element 8 is provided in the region of slat pack 4.

Secondly, the air-guiding slats 5 of the slat pack 4 are arranged in the air stream or air duct 3 such that this is divided into a multiplicity of sub-ducts 7.

The at least one additional lateral blocking element 8, as depicted for example in FIG. 1, may assume an air-guiding function at least when the air-guiding slats 5 of the slat pack 4 are in the straight-ahead position, and also form corresponding sub-ducts 7 or a corresponding sub-duct 7.

However, as FIG. 2 shows, the blocking element 8 may also be pivoted or rotated relative to the air-guiding slats 5 and the housing wall in order, as required, to block a sub-duct 7 formed between the outer air-guiding slat 5 of the slat pack 4 facing the blocking element 8 and the housing wall in the region of the slat pack 4.

In detail, FIG. 2 shows the first exemplary embodiment of the air vent 1 according to the invention in a state in which the air-guiding slats 5 of the slat pack 4 have been pivoted out of their straight-ahead position in the direction of the lateral blocking element 8, and thus lie in the first extreme position. In this extreme position of the slat pack 4, the lateral blocking element 8 blocks the sub-duct 7 or sub-ducts 7 between the outer air-guiding slat 5 of the slat pack 4 facing the blocking element 8 and the housing wall of the air vent 1.

In the second extreme position according to FIG. 3, in which the air-guiding slats 5 of the slat pack 4 are deflected to a maximum extent away from the blocking element 8, the lateral blocking element 8 again assumes the function of air guidance.

To this end, the lateral blocking element 8 can be adjusted between a straight-ahead position, in which the lateral blocking element 8 is oriented parallel to the main flow direction, and a blocking position, in which the lateral blocking element 8 is pivoted into the sub-duct 7 between the outer air-guiding slat 5 of the slat pack 4 and the housing wall, wherein the lateral blocking element 8 is in the blocking position when the air-guiding slats 5 of the slat pack 4 are in the first extreme position, wherein on transition of the blocking element 8 into the blocking position, the blocking element 8 is rotated or pivoted relative to the housing wall in a direction which is opposite the direction in which the air-guiding slats 5 of the slat pack 4 are rotated or pivoted on transition to their extreme position. In detail, FIG. 2 shows as an example the lateral blocking element 8 rotated counterclockwise into its blocking position, while the air-guiding slats 5 of the slat pack 4 are pivoted clockwise.

In particular, it is provided that the lateral blocking element 8 always runs parallel or substantially parallel to the air-guiding slats 5 of the slat pack 4, as long as the air-guiding slats 5 of the slat pack 4 are not in their first extreme position or pivoted into their first extreme position.

In order to be able to synchronize the relative movement of the lateral blocking element 8 and the air-guiding slats 5 of the slat pack 4, in the first exemplary embodiment of the air vent 1 according to the invention, a slotted guide 9 is used via which the lateral blocking element 8 is operatively coupled to the outer air-guiding slat 5 of the slat pack 4 facing the blocking element 8.

As depicted, the slotted guide 9 has a corresponding control curve 10 which is preferably formed as a slot, web or groove. A sliding block 11 of the blocking element 8 engages in this control curve 10. In the embodiment shown in the drawings, this sliding block 11 of the blocking element 8 is in particular formed as a peg. When the air-guiding slats 5 of the slat pack 4 are pivoted or rotated relative to the housing wall of the air vent 1, the sliding block 11 and hence also the blocking element 8 are positively guided accordingly.

In this context, it is essential that the control curve 10 of the slotted guide 9 is connected fixedly and directly to the slat pack 4, and in particular fixedly and directly to the air-guiding slat 5 of the slat pack 4 facing the blocking element 8.

In the exemplary embodiment of the air vent 1 shown in the drawings, the control curve 10 of the slotted guide 9 has a substantially L-shaped course. This substantially L-shaped course has a first limb region 12 and, connected thereto, a second limb region 13, wherein the first and second limb regions 12, 13 of the control curve course are preferably slightly curved in order to achieve as continuous a movement of the blocking element 8 as possible.

In particular, it is provided that the second limb region 13 of the control curve course is longer than the first limb region 12 of the control curve course, which leads to a slower movement of the blocking element 8 when the sliding block 11 of the blocking element 8 runs in the second limb region 13 of the control curve course.

As FIG. 1 shows, the control curve 10 of the slotted guide 9 is configured such that, when the air-guiding slats 5 of the slat pack 4 are in the straight-ahead position relative to the main flow direction, the sliding block 11 of the blocking element 8 is positioned in a region between the first and second limb regions 12, 13 of the control curve 10.

However, the sliding block 11 of the blocking element 8 is positioned in the first limb region 12 of the control curve 10 when the air-guiding slat 5 of the slat pack 4 facing the blocking element 8 is pivoted or rotated out of its straight-ahead position relative to the housing wall, in the direction of the blocking element 8, and when the blocking element 8 blocks the sub-duct or sub-ducts 7 between the housing wall and the outer air-guiding slat 5 of the slat pack 4 facing the blocking element 8 (see FIG. 2).

As the depiction in FIG. 3 shows, the sliding block 11 of the blocking element 8 is however positioned in the second limb region 13 of the control curve 10 when the air-guiding slat 5 of the slat pack 4 facing the blocking element 8 is pivoted or rotated out of its straight-ahead position relative to the housing wall, away from the blocking element 8.

In detail, the sliding block 11 of the blocking element 8, viewed in the main flow direction, is arranged on the blocking element 8 downstream of a rotation axis 14 of the blocking element 8 about which the blocking element 8 can be pivoted or rotated relative to the housing wall.

The first exemplary embodiment of the air vent 1 according to the invention is distinguished in that, in addition to the control curve 10 described above, the slotted guide 9 has a further control curve 15, which preferably also takes the form of a slot, web or groove, and in which a further preferably peg-shaped sliding block 16 of the blocking element 8 engages, so that on pivoting or rotation of the air-guiding slats 5 of the slat pack 4 relative to the housing wall, it is positively guided accordingly at least in regions.

The further sliding block 16 of the blocking element 8, viewed in the main flow direction, is arranged on the blocking element 8 upstream of the rotation axis 14 of the blocking element 8. Also, the further control curve 15 of the slotted guide 9 is connected fixedly to the slat pack 4, and in particular fixedly and directly to the air-guiding slat 5 of the slat pack 4 facing the blocking element 8.

As the depictions of FIGS. 1 to 3 show, the further control curve 15 in particular has a course which corresponds at least substantially to the course of the control curve 10 in the second limb region 13.

In particular, it is provided that the further sliding block 16 of the blocking element 8 is positioned in the second control curve 15 only when the air-guiding slat 5 of the slat pack 4 facing the blocking element 8 is pivoted or rotated out of its straight-ahead position relative to the housing wall, away from the blocking element 8 (see FIG. 3).

In the first exemplary embodiment according to FIGS. 1 to 3, the respective rotation axes 6 of the air-guiding slats 5 of the slat pack 4 run through a central region of the corresponding air-guiding slat 5. In the same way, the rotation axis 14 of the blocking element 8 runs through a central region of the blocking element 8.

Figure 4:
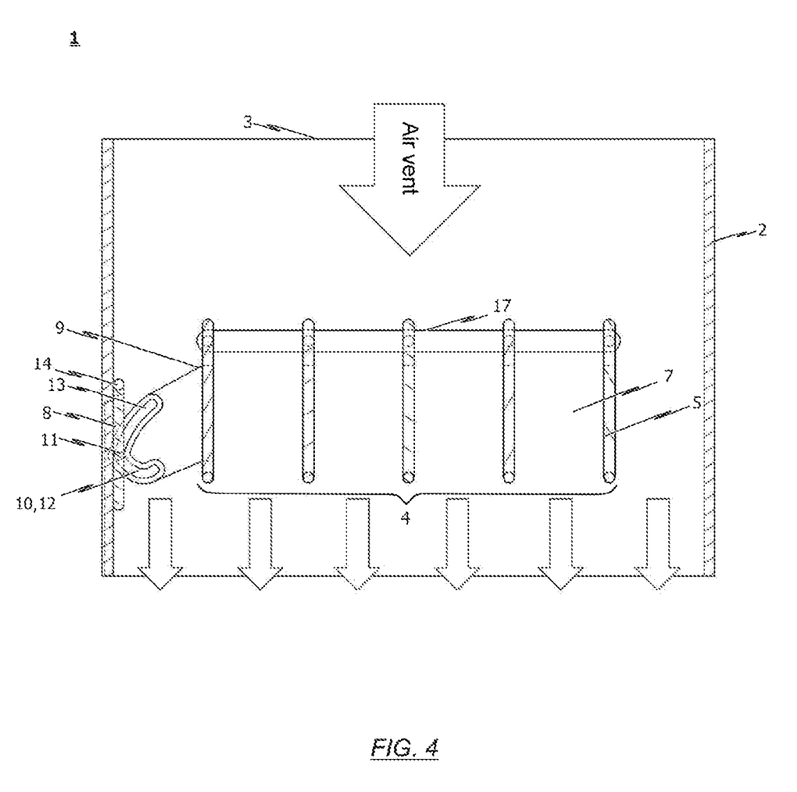
FIG. 4 a second exemplary embodiment of the air vent according to the invention in a state in which the air-guiding slats of the slat pack are in the straight-ahead position.
Figure 5:
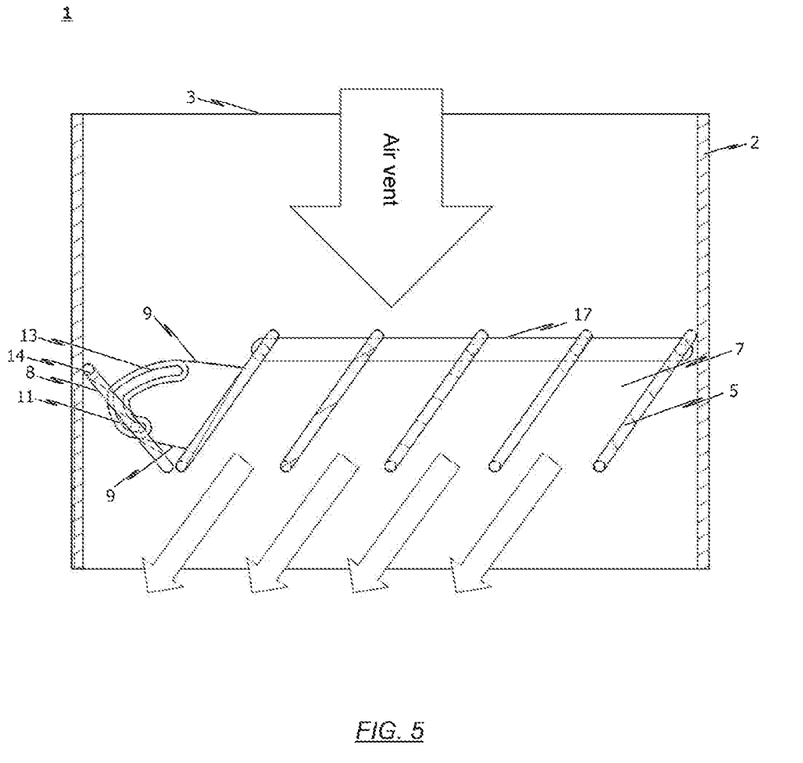
FIG. 5 diagrammatically and in a cross-sectional view, the region of the air vent from FIG. 4 but in a state in which the air-guiding slats of the slat pack are in a first extreme position, in which the air-guiding slats of the slat pack are pivoted in the direction of the lateral blocking element.
Figure 6:
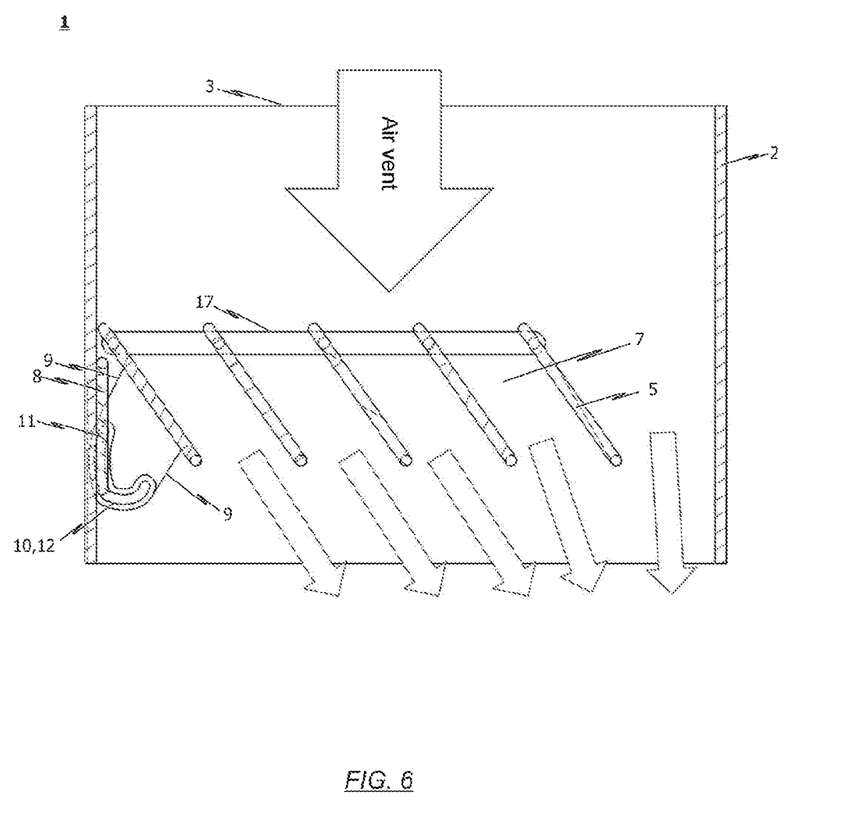
FIG. 6 diagrammatically and in a cross-sectional view, the extract of the air vent from FIG. 4 in a state in which the air-guiding slats of the slat pack are in the second extreme position.

FIGS. 4 to 6 show a further (second) exemplary embodiment of the air vent 1 according to the invention.

Structurally and functionally, the second exemplary embodiment substantially corresponds to the first exemplary embodiment described above, wherein however in the second exemplary embodiment, the respective rotation axes 6 of the air-guiding slats 5 are each provided in a downstream end region of the corresponding air-guiding slat 5, viewed in the main flow direction.

Apart from this, in the second exemplary embodiment of the air vent 1 according to the invention, it is not provided that the lateral blocking element 8 has an air-guiding function. Rather, in this embodiment, the lateral blocking element 8 is arranged directly on the housing wall, wherein however it is also conceivable to integrate the air-guiding element in the housing wall. The rotation axis 14 of the lateral blocking element 8 is provided in an upstream end region of the lateral blocking element 8, viewed in the main flow direction.

For synchronizing and coordinating the lateral blocking element 8 and the air-guiding slats 5 of the slat pack 4, again a slotted guide 9 is used with a (single) control curve 10.

FIG. 5 shows the air vent 1 in a state in which the air-guiding slats 5 of the slat pack 4 are in their first extreme position, and in which the blocking element 8 is in the blocking position and blocks the sub-duct 7 which would otherwise be provided between the outer air-guiding slat 5 of the slat pack 4 facing the blocking element 8 and the housing wall.

The solution according to the invention achieves that the air vent 1 provides as great as possible a deflection angle of the outflowing air, and at the same time a low flow resistance. In detail, the lateral blocking element 8 is provided with a peg which runs in the manner of a sliding block 11 in a guide curve which is rotationally fixedly connected to one of the air-guiding slats 5 of the slat pack 4. The guide curve controls the movement such that there is no increased resistance in an angular region between the straight-ahead position and the first extreme position in which the air is deflected away from the corresponding housing wall.

In an angular region between the straight-ahead position and the second extreme position in which the air flow is directed towards the housing wall, the lateral blocking element 8 moves in the opposite rotational direction to that of the air-guiding slats 5. In this extreme position, the lateral blocking element 8 fully or partly shuts off the region between the housing wall and the air-guiding slat 8.

In this way, the housing 2 of the air vent 1 may be designed straight, so that the air stream is not expanded when emerging from the duct. Furthermore, a good deflection angle can be achieved. The otherwise disruptive influence of a straight housing wall is avoided in that the partial air stream concerned is blocked in the vicinity of the housing wall by the lateral blocking element 8.

In addition, a low flow resistance can be achieved in the slat positions in which the air is not conducted towards the housing wall.

Since the control curve 10 of the slotted guide 9 is fixedly connected to the outer air-guiding slat 5 of the slat pack 4, an excellent stability of the control curve 10 can be achieved and the slat is mounted in the housing 2 over its entire length. In particular, no additional component, such as for example a separate coupling rod, is required since the control curve 10 is integrated in the air-guiding slat 5.

The invention is not restricted to the embodiment shown in the drawings, but results from a combined consideration of all features disclosed herein. In particular, it is also conceivable to implement the lateral blocking element 8 as a slider which is driven by an electric motor or mechanically coupled to the slat pack 4 and, when the air-guiding slats 5 of the slat pack 4 are in the first extreme position, enters the outer sub-duct 7 between the outer air-guiding slat 5 and the housing wall in order to block or close this accordingly.

It is also conceivable to provide several lateral blocking elements 8 on a housing wall, which can be moved, pivoted or rotated accordingly relative to the air-guiding slats and housing wall in order to block, as required, a sub-duct 7 formed between an outer air-guiding slat 5 of the slat pack 4 the housing wall in the region of the slat pack 4.

LIST OF REFERENCE SIGNS

1 Air vent
2 Housing
3 Air duct
4 Slat pack
5 Air-guiding slat
6 Rotation axis of air-guiding slat
7 Sub-duct
8 Lateral blocking element
9 Slotted guide
10 First control curve
11 First sliding block
12 First limb region of control curve
13 Second limb region of control curve
14 Rotation axis of blocking element
15 Further control curve
16 Further sliding block
117 Synchronization element

The invention claimed is:

1. An air vent for a vehicle, the air vent comprising:
a housing with a housing wall that delimits, at least regionally, an air duct for air flowing through the air vent along a main flow direction, wherein, in the air duct, there is provided at least one air-guiding slat, which is pivotable or rotatable relative to the housing wall about an axis of rotation, or a slat pack having a multiplicity of air-guiding slats, which are pivotable or rotatable relative to the housing wall about in each case one axis of rotation, such that, in the region of the at least one air-guiding slat or in the region of the slat pack, the air duct is subdivided into a multiplicity of sub-ducts, wherein there is additionally provided at least one lateral blocking element, which is displaceable, pivotable or rotatable relative to the at least one air-guiding slat or the slat pack and to the housing wall for blocking, as required, a sub-duct formed between the at least one air-guiding slat or an outer air-guiding slat of the slat pack and the housing wall;

wherein the at least one blocking element is operatively coupled to the at least one air-guiding slat, or to the outer air-guiding slat of the slat pack, via a slotted guide;

wherein the slotted guide has a first slot-shaped, web-shaped or groove-shaped control curve, into which a peg-shaped sliding block of the blocking element engages and is guided when the at least one air-guiding slat or the air-guiding slats of the slat pack are pivoted or rotated relative to the housing wall;

wherein the slotted guide has a further slot-shaped, web-shaped or groove-shaped control curve, into which a further peg-shaped sliding block of the blocking element engages and is guided when the at least one air-guiding slat or the air-guiding slats of the slat pack are pivoted or rotated relative to the housing wall.

2. The air vent as claimed in claim 1,
wherein the at least one air-guiding slat or the air-guiding slats of the slat pack is/are adjustable between a straight-ahead position, in which the at least one air-guiding slat or the air-guiding slats of the slat pack is/are each oriented parallel to the main flow direction, and at least one extreme position, in which the at least one air-guiding slat or the air-guiding slats of the slat pack is/are deflected to a maximum extent relative to the main flow direction, and wherein the at least one lateral blocking element is designed to block the sub-duct between the at least one air-guiding slat or an outer air-guiding slat of the slat pack and the housing wall only in one of the at least one extreme position of the at least one air-guiding slat or the air-guiding slats of the slat pack.

3. The air vent as claimed in claim 2,
wherein the at least one lateral blocking element is adjustable between a straight-ahead position, in which the lateral blocking element is oriented parallel to the main flow direction, and a blocking position, in which the lateral blocking element is pivoted into the sub-duct between the at least one air-guiding slat or the outer air-guiding slat of the slat pack and the housing wall, wherein the at least one lateral blocking element is in the blocking position if the at least one air-guiding slat or the air-guiding slats of the slat pack is/are in an extreme position, and wherein, when the transition into the blocking position is realized, the at least one blocking element is rotated or pivoted relative to the housing wall in a direction which is opposite a direction in which the at least one air-guiding slat or the air-guiding slats of the slat pack is/are rotated or pivoted when the transition into the extreme position is realized.

4. The air vent as claimed in claim 3,
wherein the at least one lateral blocking element is designed to assume its blocking position only if the outer air-guiding slat, facing the at least one lateral blocking element, of the slat pack or the at least one air-guiding slat assumes its extreme position which is pivoted in a direction of the lateral blocking element.

5. The air vent as claimed in claim 2,
wherein the at least one lateral blocking element is designed to extend, in the straight-ahead position of the at least one air-guiding slat or of the air-guiding slats of the slat pack, parallel to the at least one air-guiding slat or the air-guiding slats and, when the at least one air-guiding slat or the air-guiding slats are pivoted out of the straight-ahead position away from the lateral blocking element, to follow the pivoting movement of the at least one air-guiding slat or of the air-guiding slats and to serve as an air-guiding element.

6. The air vent as claimed in claim 1,
wherein the control curve is connected fixedly to the at least one air-guiding slat or to the slat pack.

7. The air vent as claimed in claim 6,
wherein the control curve has an L-shaped profile with a first limb region and a second limb region, wherein the first and second limb regions of the control curve profile are of curved form, and wherein the second limb region of the control curve profile is formed to be longer than the first limb region of the control curve profile.

8. The air vent as claimed in claim 7,
wherein the control curve is designed such that, in a straight-ahead position, with respect to the main flow direction, of the at least one air-guiding slat or of the air-guiding slats of the slat pack, the sliding block of the blocking element is positioned in a region between the first and second limb regions of the control curve, and such that the sliding block of the blocking element is positioned in the first limb region of the control curve if the at least one air-guiding slat, facing the blocking element, or air-guiding slat, facing the blocking element, of the slat pack is pivoted or rotated out of the straight-ahead position relative to the housing wall in a direction of the blocking element, and such that the sliding block of the blocking element is positioned in the second limb region of the control curve if the at least one air-guiding slat, facing the blocking element, or air-guiding slat, facing the blocking element, of the slat pack is pivoted or rotated out of its straight-ahead position relative to the housing wall away from the blocking element.

9. The air vent as claimed in claim 6,
wherein the sliding block of the blocking element is, as seen in the main flow direction, arranged on the blocking element downstream of an axis of rotation of the blocking element.

10. The air vent (1) as claimed in claim 9,
wherein the further sliding block of the blocking element is, as seen in the main flow direction, arranged on the blocking element upstream of the axis of rotation of the blocking element, and wherein the further control curve is connected fixedly to the at least one air-guiding slat or to the slat pack.

11. The air vent as claimed in claim 7,
wherein the further control curve has a profile which corresponds, at least substantially, to the profile of the control curve in the second limb region, and wherein the further sliding block of the blocking element is positioned in the further control curve only if the at least one air-guiding slat, facing the blocking element, or air-guiding slat, facing the blocking element, of the slat pack is pivoted or rotated out of its straight-ahead position relative to the housing wall away from the blocking element.

12. The air vent as claimed in claim 9, wherein the axis of rotation of the at least one air-guiding slat or the respective axes of rotation of the air-guiding slats extends/each extend through a central region of the corresponding air-guiding slat, and wherein the axis of rotation of the blocking element extends through a central region of the blocking element.

13. The air vent as claimed in claim 9,
   wherein the axis of rotation of the at least one air-guiding slat or the respective axes of rotation of the air-guiding slats extends/each extend through an end region of the corresponding air-guiding slat, which end region is downstream as seen in the main flow direction, and wherein the axis of rotation of the blocking element extends through an end region of the blocking element, which end region is upstream as seen in the main flow direction.

14. The air vent as claimed in claim 1,
   wherein a synchronization mechanism is assigned to the air-guiding slats of the slat pack for synchronizing a pivoting or rotational movement of the air-guiding slats relative to the housing wall, such that, in each position of the air-guiding slats relative to the main flow direction, the air-guiding slats of the slat pack are oriented parallel to one another.

15. An air vent for a vehicle, the air vent comprising:
   a housing with a housing wall that delimits, at least regionally, an air duct for air flowing through the air vent along a main flow direction, wherein, in the air duct, there is provided at least one air-guiding slat, which is pivotable or rotatable relative to the housing wall about an axis of rotation, or a slat pack having a multiplicity of air-guiding slats, which are pivotable or rotatable relative to the housing wall about in each case one axis of rotation, such that, in the region of the at least one air-guiding slat or in the region of the slat pack, the air duct is subdivided into a multiplicity of sub-ducts, wherein there is additionally provided at least one lateral blocking element, which is displaceable, pivotable or rotatable relative to the at least one air-guiding slat or the slat pack and to the housing wall for blocking, as required, a sub-duct formed between the at least one air-guiding slat or an outer air-guiding slat of the slat pack and the housing wall;
   wherein the at least one blocking element is operatively coupled to the at least one air-guiding slat, or to the outer air-guiding slat of the slat pack, via a slotted guide;
   wherein the slotted guide has a first slot-shaped, web-shaped or groove-shaped control curve, into which a peg-shaped sliding block of the blocking element engages and is guided, when the at least one air-guiding slat or the air-guiding slats of the slat pack are pivoted or rotated relative to the housing wall, wherein the slotted guide is fixedly connected to the at least one air-guiding slat or to the outer slat of the slat pack such that the slotted guide pivots or rotates, with the at least one air-guiding slat or the outer slat, about the axis of rotation of the at least one air-guiding slat or the outer slat.

16. The air vent of claim 15, wherein the sliding block of the blocking element is, as seen in the main flow direction, arranged on the blocking element downstream of the axis of rotation of the blocking element.

17. An air vent for a vehicle, the air vent comprising:
   a housing with a housing wall that delimits, at least regionally, an air duct for air flowing through the air vent along a main flow direction, wherein, in the air duct, there is provided at least one air-guiding slat, which is pivotable or rotatable relative to the housing wall about an axis of rotation, or a slat pack having a multiplicity of air-guiding slats, which are pivotable or rotatable relative to the housing wall about in each case one axis of rotation, such that, in the region of the at least one air-guiding slat or in the region of the slat pack, the air duct is subdivided into a multiplicity of sub-ducts, wherein there is additionally provided at least one lateral blocking element, which is displaceable, pivotable or rotatable relative to the at least one air-guiding slat or the slat pack and to the housing wall for blocking, as required, a sub-duct formed between the at least one air-guiding slat or an outer air-guiding slat of the slat pack and the housing wall;
   wherein the at least one air-guiding slat or the air-guiding slats of the slat pack is/are adjustable between a straight-ahead position, in which the at least one air-guiding slat or the air-guiding slats of the slat pack is/are each oriented parallel to the main flow direction, and at least one extreme position, in which the at least one air-guiding slat or the air-guiding slats of the slat pack is/are deflected to a maximum extent relative to the main flow direction;
   wherein the at least one lateral blocking element is adjustable between a straight-ahead position, in which the lateral blocking element is oriented parallel to the main flow direction, and a blocking position, in which the lateral blocking element is pivoted into the sub-duct between the at least one air-guiding slat or the outer air-guiding slat of the slat pack and the housing wall;
   wherein the at least one lateral blocking element is designed to assume its blocking position only if the outer air-guiding slat, facing the at least one lateral blocking element, of the slat pack or the at least one air-guiding slat assumes its extreme position which is pivoted in a direction of the lateral blocking element.

\* \* \* \* \*